United States Patent
Kosik et al.

(10) Patent No.: US 10,354,163 B2
(45) Date of Patent: Jul. 16, 2019

(54) ENHANCED COMPUTER VISION USING OBJECT LOCATION INFORMATION

(71) Applicant: HONEYWELL INTERNATIONAL INC., Morris Plains, NJ (US)

(72) Inventors: Michal Kosik, Dolny Kubin (SK);
Ondrej Pokorny, Merin (CZ);
Marketa Szydlowska, Brno (CZ);
Patrik Moravek, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 17 days.

(21) Appl. No.: 15/626,942

(22) Filed: Jun. 19, 2017

(65) Prior Publication Data

US 2018/0365514 A1 Dec. 20, 2018

(51) Int. Cl.
| | |
|---|---|
| G06K 9/00 | (2006.01) |
| G01S 5/04 | (2006.01) |
| G06K 9/46 | (2006.01) |
| G06N 20/00 | (2019.01) |
| G06T 7/00 | (2017.01) |
| G06F 16/583 | (2019.01) |

(52) U.S. Cl.
CPC .............. G06K 9/4609 (2013.01); G01S 5/04 (2013.01); G06K 9/00771 (2013.01); G06N 20/00 (2019.01); *G06F 16/5854* (2019.01); *G06F 2221/2149* (2013.01); *G06T 7/97* (2017.01)

(58) Field of Classification Search
CPC combination set(s) only.
See application file for complete search history.

(56) References Cited

U.S. PATENT DOCUMENTS

| | | | | |
|---|---|---|---|---|
| 9,165,366 | B2* | 10/2015 | Koukol | G08G 5/0021 |
| 9,318,025 | B2* | 4/2016 | Conner | G08G 5/065 |
| 9,472,109 | B2* | 10/2016 | Starr | G06F 3/0484 |
| 9,563,272 | B2 | 2/2017 | Karakotsios et al. | |
| 9,581,692 | B2* | 2/2017 | Lamkin | G08G 5/0021 |
| 9,734,729 | B2* | 8/2017 | Beda | G08G 5/065 |
| 9,959,774 | B2* | 5/2018 | Vasek | G08G 5/04 |
| 2009/0219411 | A1 | 9/2009 | Marman et al. | |
| 2011/0187563 | A1* | 8/2011 | Sanders-Reed | G06F 3/14 340/971 |
| 2012/0105634 | A1* | 5/2012 | Meidan | G08B 13/1965 348/143 |

(Continued)

OTHER PUBLICATIONS

Extended EP Search Report for Application No. 18177880.4 dated Nov. 12, 2018.

*Primary Examiner* — Tsung Yin Tsai
(74) *Attorney, Agent, or Firm* — Lorenz & Kopf, LLP (57) ABSTRACT

Systems and methods for an enhanced computer vision module are presented. The system receives host locating information, and determines a position and a location of the host based on the host locating information. The system determines a field of view (FOV) of the host based on the host locating information, and controls a camera associated with the host that is configured to record a video stream comprising the FOV. The system and method provide an improvement over conventional computer vision (CV) systems by utilizing object locating information that is transmitted, and also by keeping a storage table of learned and fixed objects. The provided system and method improve the efficiency of object recognition and computer aided maintenance (CAM).

19 Claims, 6 Drawing Sheets

(56) References Cited

U.S. PATENT DOCUMENTS

| | | |
|---|---|---|
| 2014/0218520 A1 | 8/2014 | Teich et al. |
| 2015/0146007 A1 | 5/2015 | Dusik et al. |
| 2015/0163764 A1* | 6/2015 | Stern ........................ H04N 7/18 348/143 |
| 2016/0116960 A1 | 4/2016 | Kwak et al. |

* cited by examiner

ENHANCED COMPUTER VISION USING OBJECT LOCATION INFORMATION

TECHNICAL FIELD

The technical field generally relates to computer vision systems, and more particularly relates to systems and related operating methods for enhanced computer vision using transmitted object location information.

BACKGROUND

Computer vision (CV) is used in many forms and across a variety of applications. The image data fed into CV algorithms can be used for object recognition. With CV-based object recognition algorithms analyze the image data to identify an object among a plurality of objects in an image. For example, image data of a vehicle could be analyzed by a CV algorithm to identify an engine among the plurality of objects making up the vehicle. The CV algorithms may, in additional rounds of processing, analyze the identified object to identify a specific component of the object. Continuing with the engine example, engine image data could be analyzed to identify a specific valve in the engine.

Computer aided maintenance (CAM) is an application that uses image data for object recognition using CV. Once the image data is used to identify a component, a maintenance procedure for the component, such as repair or replace, may be desired. In support of this, CAM applications generally combine CV algorithms with augmented reality (AR) algorithms to provide, on some type of display device, information and/or instructions associated with the identified component, such as the desired maintenance procedures. In some cases, CAM applications also record activities (i.e., the performed maintenance procedures) responsive to the provided instructions, for later inspection.

A technological problem is presented when the image data is complex or comprises a plurality of objects. Although CV algorithms continue to be developed, using computer vision to detect a specific object among a large number of objects can be very computationally and memory intensive. The user experiences the extensive computations as a long object recognition time. The CV system experiences the extensive computations as a large power drain. In addition to long object recognition times, conventional CV systems lack other desirable technological features, such as a capability of determining a distance or spatial relationship between a host and the recognized object. The provided systems and methods for enhanced computer vision improve upon existing CV systems by addressing these technological problems in an unconventional way, in addition to providing other technological enhancements.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided. The method comprising: receiving, at an enhanced computer vision module, host locating information for a host; determining a field of view (FOV) of the host based on the host locating information; configuring a camera associated with the host to record a video stream comprising the FOV; receiving, from transmitting signals, object locating information for an object; determining, based on the object locating information, that the object is in the FOV; and activating the camera to record a video stream inclusive of the object while the object is in the FOV.

Also provided is a system. The system comprising: an enhanced computer vision module on a host, comprising a processor, a memory device, and a database; and a receiver coupled to the enhanced computer vision module, for receiving transmitted signals; the enhanced computer vision module configured to receive host locating information; determine a position and a location of the host based on the host locating information; determine a field of view (FOV) of the host based on the host locating information; configure a camera associated with the host to record a video stream comprising the FOV; receive, from transmitting signals, object locating information for an object; determine, based on the object locating information, the identity of the object, and that the object is in the FOV; and activate the camera to record a video stream inclusive of the object while the object is in the FOV.

Another method is provided. The method comprising: obtaining inertial data from an inertial system that is associated with a user; determining a field of view (FOV) associated with the user based on the inertial data; initializing a camera coupled to the inertial system and configured to record a video stream comprising the FOV; continuously processing received transmitting signals comprising object locating information to determine whether the FOV includes an object of interest; and when the FOV includes the object of interest, activating the camera to record a video stream inclusive of the object of interest; processing the video stream to identify a component of the object of interest; and when the FOV does not include the object of interest, deactivating the camera.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided enhanced computer vision system and method may take the form of a computer vision module (FIG. 1, 104), and may be separate from, or integrated within, a preexisting computer vision or augmented reality system.

Figure 1:
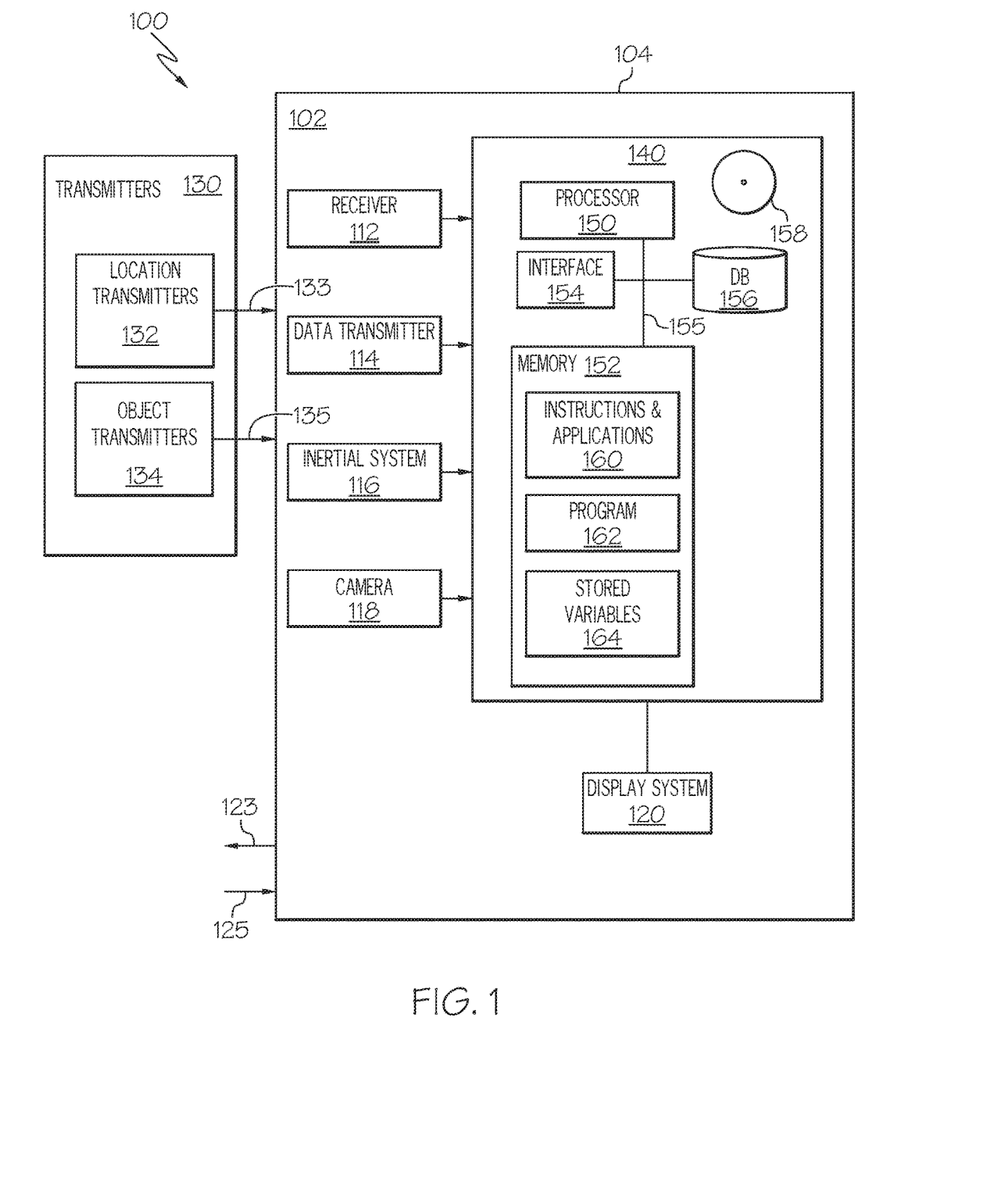
FIG. 1 is a functional block diagram illustrating an enhanced computer vision system, in accordance with various exemplary embodiments.

As mentioned, a technological problem is presented when image data from a computer vision system comprises a plurality of objects to sort through and perform object recognition. Provided is a technological solution to this problem based on receiving transmitted signals with object information therein, and novel rules processing. Transmitted signals that comprise location and/or object data are received and processed by the enhanced computer vision system (FIG. 1, 102). The enhanced computer vision system (FIG. 1, 102) executes an algorithm and rules to process the data from the transmitted signals, which delivers an improvement manifested as accelerated object recognition over that provided by conventional CV systems. The provided enhanced computer vision system (FIG. 1, 102) may also determine which recognized objects are relevant to a host, and determine a distance and spatial relationships between the host and the various recognized objects. Further, the enhanced computer vision system (FIG. 1, 102) may identify a position and location of a host, a field of view (FOV) of the host, and employ these determinations to disregard objects that are not in the FOV of the host. Disregarding objects not in the FOV of the host may enhance a host's privacy and further reduce computation time and power consumption. The below description provides more detail as to these functions.

Turning now to FIG. 1, a functional block diagram of a CV environment 100 comprising a computer vision system 102 and a plurality of transmitters 130 is depicted, in accordance with various exemplary embodiments. The computer vision system 102 receives, from the plurality of transmitters 130, location transmitting signals 133 and object transmitting signals 135; location transmitting signals 133 and object transmitting signals 135 are collectively referred to as transmitted signals. In the depicted embodiment, a support structure 104 houses the computer vision system 102. Other embodiments may combine or couple computer vision system 102 components differently, as is described in more detail below. The support structure 104 may be deployed as any one of a variety of wearable platforms, such as glasses, goggles, helmets, and wearable display devices. In other embodiments, the support structure 104 may be a fixed object, building, vehicle, or the like.

In the depicted embodiment, the computer vision system 102 includes: a receiver 112 for receiving the transmitted signals, a computer vision module 140 for receiving and processing the received transmitted signals, and a data transmitter 114 for sending processed information (such as object identifications, and positions and locations) externally, as transmitted information 123. In various embodiments, the computer vision system 102 may include an inertial system 116, a camera 118, and a display system 120. In operation of the computer vision system 102, the processor 150 and data transmitter 114 prepare data and perform appropriate signal processing to transmit information 123 externally, for use by a variety of external subsystems and components. The operation of these functional blocks is described in more detail below.

Commands and user inputs may be received at input 125, from any of a variety input devices (not shown). Non-limiting examples of input via input 125 include: entering values for stored variables 164, loading or updating instructions and applications 160 (including program 162), providing confirmations and/or cancellations for commands, and loading and updating the contents of the database 156, each of which is described in more detail below.

The computer vision system 102 is capable of continually: receiving a plurality of transmitted signals (133 and 135), distinguishing, for each received transmitted signal of the plurality of received transmitted signals, which of the plurality of transmitters 130, and which type of transmitter (location transmitters 132 and object transmitters 134) provided the received transmitted signal. Based thereon, the computer vision system 102 transforms and processes information in the received transmitted signals further, as described in more detail below.

The receiver 112 and the data transmitter 114 each can support a variety of types of wireless communication, and can perform signal processing (e.g., digitizing, data encoding, modulation, etc.) as is known in the art. In some embodiments, the receiver 112 and the data transmitter 114 are integrated as a transceiver, and they may be further integrated with the computer vision module 140.

The inertial system 116 may comprise a geolocating system or global positioning system. The camera 118 may be any image or video recording device with the resolution required by the application. The display system 120 be integrated within glasses, goggles, a helmet, and other user wearable displays. The display system 120 may be implemented using any one of numerous known display devices suitable for rendering textual, graphic, and/or iconic information in a format viewable by a user. The display devices may provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology. The display system 120 may be under the control of the enhanced computer vision module 140.

The enhanced computer vision module 140 performs the functions of the computer vision system 102. With continued reference to FIG. 1, within the enhanced computer vision module 140, the processor 150 and the memory device 152 form an engine that executes program instructions and performs the processing activities constituting the method steps described below. The computer vision module 140 provides a technological improvement over limitations of conventional computer vision systems, in part, by employing received location information and a learned/fixed objects database 156 (described below) prior to transmitting information 123 and/or commanding the camera 118 or the display system. These concepts are described in more detail below.

The computer vision module 140 also includes an interface 154, communicatively coupled to the processor 150 and memory device 152 (via a bus 155), database 156, and an optional storage disk 158. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

Computer readable storage media, such as a memory device 152, the database 156, or a disk 158 may be utilized as both storage and a scratch pad during operation of the computer vision module 140. The memory locations where data bits are maintained are physical locations that have particular electrical, magnetic, optical, or organic properties corresponding to the data bits. The memory device 152 can be any type of suitable computer readable storage medium. For example, the memory device 152 may include various types of dynamic random access memory (DRAM) such as SDRAM, the various types of static RAM (SRAM), and the various types of non-volatile memory (PROM, EPROM, and flash). In certain examples, the memory device 152 is located on and/or co-located on the same computer chip as the processor 150. In the depicted embodiment, the memory device 152 includes the above-referenced instructions and applications 160, the program 162, stored variables 164. Program 162 comprises the novel enhanced CV and AR rules and instructions sufficient to create, in cooperation with the processor 150, the engine of the enhanced computer vision module 140. In various embodiments, the enhanced computer vision module 140 performs actions and functions in accordance with steps of the method 600 shown in FIG. 6.

The database 156 is a computer readable storage medium in the form of any suitable type of storage apparatus, including direct access storage devices such as hard disk drives, flash systems, floppy disk drives and optical disk drives. In one exemplary embodiment, the database 156 stores a lookup table comprising fixed objects and their position and location. Fixed objects may include walls, doors, counter tops, shelving, and the like. In various embodiments, database 156 may also comprise learned objects and their position and location. In a non-limiting example, a learned object is a jet aircraft that is parked in a hangar. In another example, a learned object encompasses a forbidden object or forbidden area, such as export control. Information from location and/or object transmitters may be processed to determine the jet aircraft identification and the jet aircraft position and location. Accordingly, database 156 may be referred to herein as being a learned/fixed object database.

The bus 155 serves to transmit programs, data, status and other information or signals between the various components of the computer vision module 140. The bus 155 can be any suitable physical or logical means of connecting computer systems and components. This includes, but is not limited to, direct hard-wired connections, fiber optics, infrared and wireless bus technologies. During operation, the program 162, stored in the memory device 152, is loaded and executed by the processor 150.

The interface 154 enables communications within the computer vision module 140, and can include one or more wired or wireless network interfaces to communicate with external systems or components. Interface 154 can be implemented using any suitable method and apparatus. For example, the interface 154 enables communication from a system driver and/or another computer system. In one embodiment, the interface 154 obtains a command from the user input devices 106 directly. The interface 154 may also include one or more network interfaces for communication with technicians, and/or one or more storage interfaces for connecting to computer readable storage, such as the database 156.

During operation, the processor 150 loads and executes one or more programs, algorithms and rules embodied as instructions and applications 160 contained within the memory device 152 and, as such, controls the general operation of the computer vision module 140 as well as the computer vision system 102. In executing the process described herein, such as the method 600 of FIGS. 6-7, the processor 150 loads and specifically executes the program 162, to thereby realize an unconventional technological improvement to conventional computer vision systems. Additionally, the processor 150 is configured to process received transmitted signals, and, in various embodiments, inertial data from the inertial system 116, and to command the camera 118 and display system 120 based thereon. A method 600 for a computer vision system is provided in connection with FIGS. 6-7.

It will be appreciated that computer vision system 102 may differ from the embodiment depicted in FIG. 1. As a first example, in various embodiments, the inertial system 116, and/or the camera 118 may not be present. In addition, the display system 120 may not be present, or may be external to the computer vision system 102. Regardless of the state of integration of these components, a user may control one or more features of the computer vision system 102 by providing user input at input 125, and an external component may receive processed and transmitted data at 123.

Figure 2:
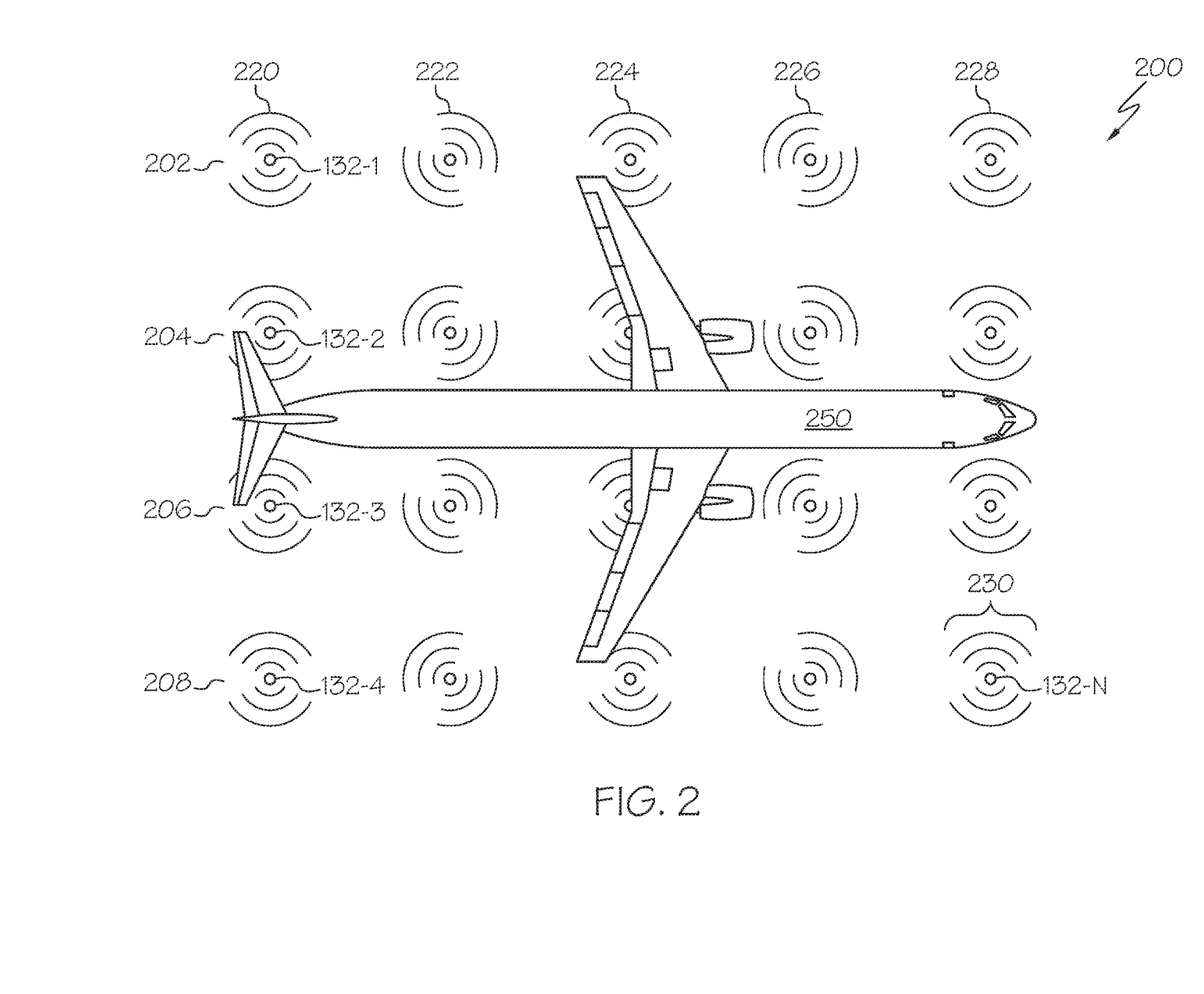
FIG. 2 is an illustration showing an array of location transmitters, in accordance with various exemplary embodiments.
Figure 3:
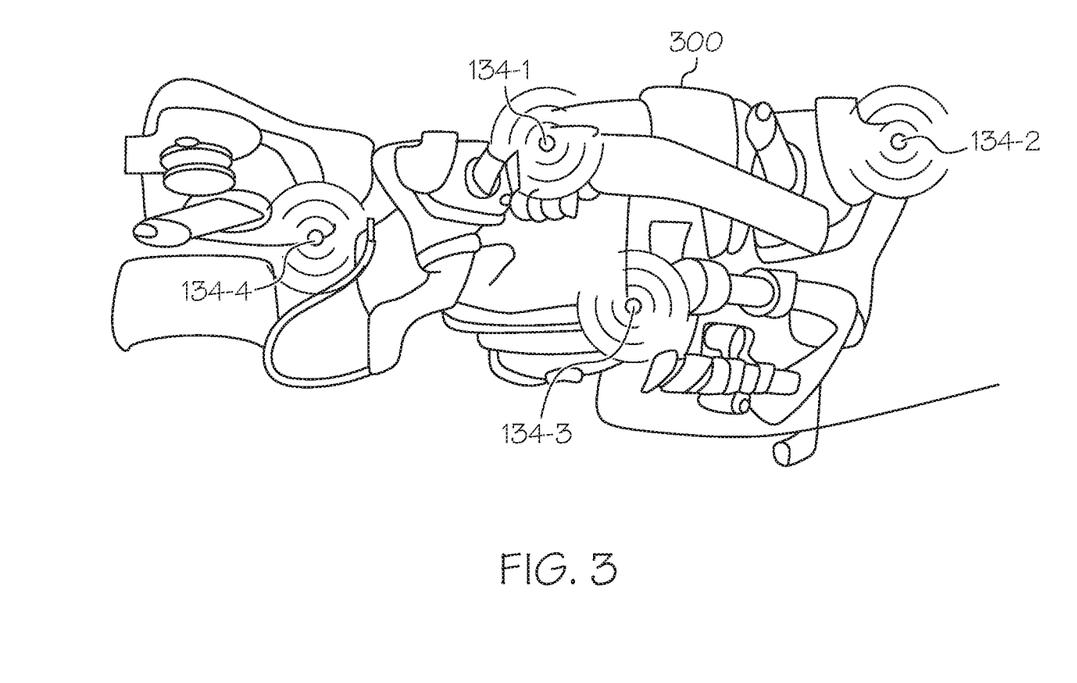
FIG. 3 is an illustration showing object transmitters affixed to an object, in accordance with various exemplary embodiments.

As mentioned, location transmitting signals 133 and object transmitting signals 135 are collectively referred to as transmitted signals. In operation, a transmitted signal that is received by receiver 112 may be sourced from one or more of the plurality of transmitters 130. Further, the plurality of transmitters 130 may comprise one or more location transmitters 132 and/or one or more object transmitters 134. To illustrate this distinction, FIG. 2 shows an exemplary use of the location transmitters 132, and FIG. 3 shows an exemplary use of the object transmitters 134. As may be understood from the below discussion, each transmitter 130 of the plurality of transmitters 130 may comprise some processing capacity and memory for storage, in addition to components for sensing and transmitting, sufficient to perform the below described functions. Regardless of their individual components, the transmitters 130 perform the functions described below.

With reference to FIG. 2, location transmitters 132 (labeled 132-1, 132-2, 132-3, 132-4, and 132-N) comprise a network of location transmitters that are arranged in known, fixed locations, in an area, such as a ceiling, wall or floor, and they send respective location transmitting signals (collectively referred to as "LT signals 133"). In various embodiments, the physical network, i.e., the arrangement and placement of the plurality (N) of location transmitters 130 in the network, may be uploaded and stored ahead of time in the computer vision module 140. In other embodiments, as part of the initialization process, the computer vision module 140 may receive one or more LT signals 133 and construct therefrom the physical network of the location transmitters 130. Accordingly, it is understood that for each location transmitter 132 of the plurality (N) of location transmitters 132, the LT signal 133 may comprise therein some (i) position and location (P and L) information, and (ii) some network membership information. As used herein, "P and L and network membership information" means, for example, that a location transmitter 132-3 may know that it is one of 40 total location transmitters 132 that are arranged in four rows (202, 204, 206, and 208) of five columns (220, 222, 224, 226, and 228) each, on a floor 200, and that 132-3 is in the third row (row 206) and first column (column 220). Further, location transmitters 132 are understood to comprise a means for sensing objects within its assigned volume 230 of space, and transmit that sensed information within their LT signals 133. In FIG. 2, a volume assigned to location transmitter 132-N is depicted as a generally circular area 230, but it is readily understood that the volume has a third dimension and may take other shapes. When a location transmitter 132 of the plurality of location transmitters 132 senses an object or portion thereof in its assigned volume 230, it includes sensed information in its respective LT signal 133.

In contrast to location transmitters 132, object transmitters 134 are affixed on an object and the object may move around in space. Although not the subject of the present application, any of a variety of techniques may be employed to affix the object transmitters 134 to an object. Non-limiting examples of such objects include an aircraft, an engine, and a wheel. FIG. 3 depicts an engine 300 as an exemplary object, with object transmitters 134-1, 134-2, 134-3, and 134-4 fixedly arranged in a specific pattern on the engine 300. An object transmitting signal (OT signal 135) comprises an object identification, in enough detail to distinguish the object from other similar objects. For example, an object identification may include a make, model, version, year, and the like. Similar to location transmitters 132, an object transmitter 134 may additionally send, in the OT signal 135, its own P and L information and network membership information. For example, the object transmitter 134-2 may know that it is one of four object transmitters 134 fixedly arranged on the engine 300, in a specific pattern of object transmitters 134, and which one of the object transmitters 134 in the specific pattern of the object transmitters 134 that it is.

Figure 4:
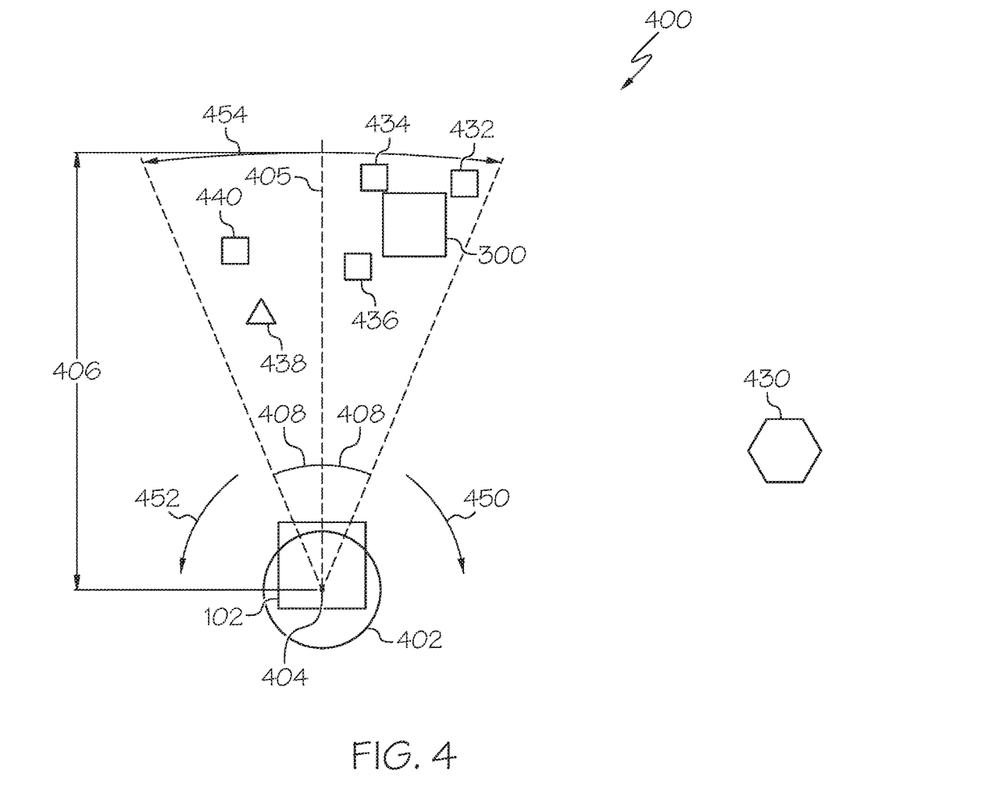
FIG. 4 is a top down illustration showing an enhanced computer vision system and a field of view associated with a user, in accordance with various exemplary embodiments.

FIG. 4 provides a simplified top down illustration of a CV viewing environment 400, in accordance with an embodiment of the computer vision system 102. In FIG. 4, a user 402 is the host. The user 402 is wearing the computer vision system 102, for example, as part of a helmet or glasses. The inertial system 116 provides inertial data associated with the user 402. The computer vision module 140 executes program 162 to process the inertial data to determine an orientation of the user 402 and a field of view (FOV 454) from the perspective of the user 402. In an embodiment, the FOV 454 extends forward a length 406 from a central point 404 associated with the user. A midline 405 of the FOV 454 extends from the central point 404 forward. In the depicted embodiment, the FOV 454 is generally cone shaped, extending in three dimensions around the midline 405 by angle 408 measured from the midline 405. In some embodiments, angle 408 may be a configurable variable that is predetermined and stored in stored variables 164, and in other embodiments, angle 408 may be a configurable variable that is configured and reconfigured (for example, responsive to a change in user 402, or another variable) during operation of the computer vision system 102. If the user 402 were to turn his head right 450 or left 452, the FOV 454 would keep substantially the same dimensions as described, but rotate along with the user's 402 head. Although the FOV 454 is depicted as generally cone shaped, a variety of other shapes may be utilized. In addition, although the FOV 454 is depicted as associated with a direction that the user 402 is looking, in other embodiments, the host may not be a user, and the FOV 454 may be a region of space that is determined with respect to a reference other than a user's 402 viewpoint.

In addition to recognizing objects, the computer vision system 102 may determine whether a recognized object is an object of interest or a forbidden object or area; this determination may comprise referencing the learned/fixed objects database 156, and/or executing rules programmed into the program product 162. Determining that the object is an object of interest in this manner is highly efficient over conventional CV systems that systematically process image data and sort through it to identify objects, as it is not reliant upon image data or the camera 118 for this step at all this is described in more detail as follows. The viewing environment 400 of the user 402 comprises objects 430, 432, 434, 436, 438, 440, and engine 300. The computer vision system 102 brings a technological improvement over conventional CV systems by identifying objects as follows: first, receiving the transmitted signals comprising object P and L information, and second, processing and comparing the object P and L information to the FOV 454 information. The computer vision system 102 quickly and efficiently determines (i) that objects 432, 434, 436, 438, 440, and engine 300, are within the FOV 454, whereas object 430 is not; (ii) an identification for each respective object; and (iii) that, of the objects in the FOV 454, the engine 300 is the only object of interest in the FOV 454. Notably, determinations (i)-(iii) are spatial and may be performed without analyzing any CV image data.

It is understood that, for embodiments comprising a camera, the camera 118 is configured to record the FOV 454, and to move along with the FOV 454. Responsive to determining that there is an object of interest in the FOV 454, the computer vision system 102 may activate the camera 118 to begin to record a video stream, thereby capturing image data comprising the engine 300. When the inertial system 116 detects that the user 402 has turned his head to the right 450, or to the left 452 enough that FOV 454 no longer substantially surrounds engine 300, (and provided that no other object of interest is in the FOV 454 at that time) the computer vision system 102 may deactivate the camera 118.

Figure 5:
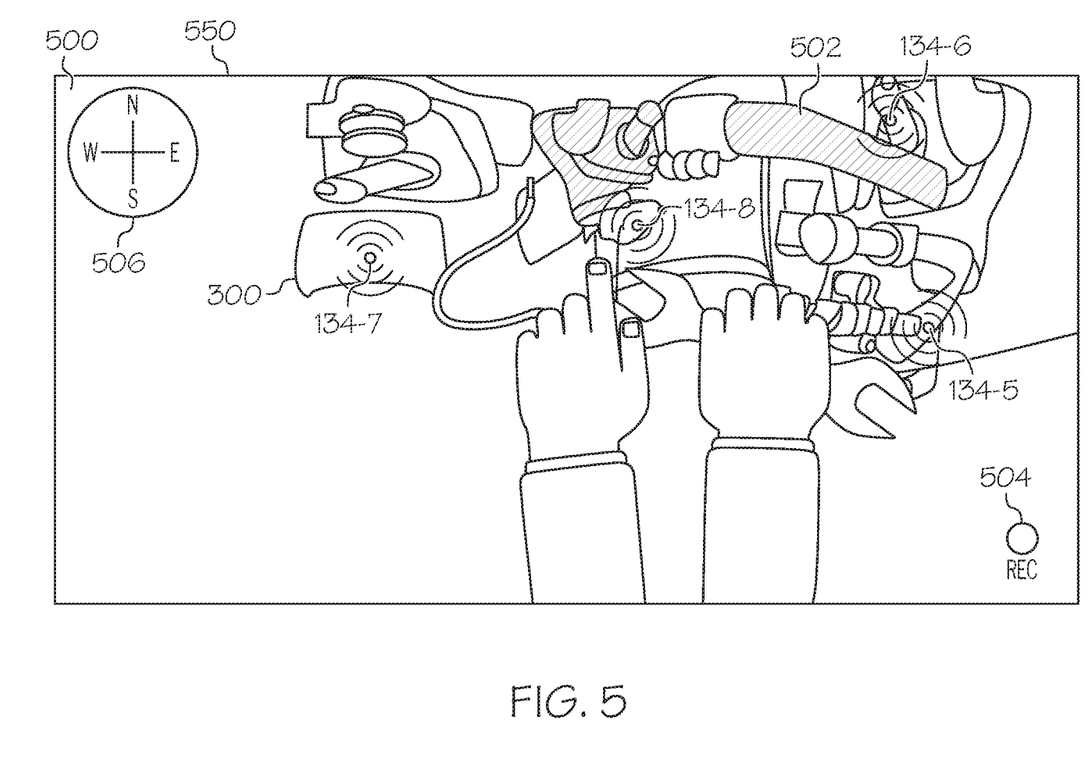
FIG. 5 is an illustration of an engine with a highlighted component, in accordance with various exemplary embodiments.

Referring now to FIG. 5 and with continued reference to FIG. 3, the enhanced computer vision system 102 is shown providing a technological improvement in the field of computer aided maintenance (CAM). Engine 300 is shown having affixed thereon object transmitters 134-5, 134-6, 134-7, and 134-8. Each object transmitter (134-5, 134-6, 134-7, and 134-8) transmits a respective OT signal of the collective OT signals 135. The enhanced computer vision system 102 receives the OT signals 135, and processes the object data from them with the learned/fixed database 156 to identify or recognize objects, thereby reducing or eliminating extensive processing. In various embodiments, the enhanced computer vision system 102 also processes the CV image data with the object data and learned/fixed database 156. In various embodiments, LT signals 133 can also be processed to more quickly and efficiently identify or recognize the object. As may readily be appreciated, the position and location information based on the transmitted signals are sufficient to determine an orientation of the object.

At this point, a comparison to conventional CAM systems is appropriate. In conventional CAM systems, a video stream provides image data, and the image data is exhaustively analyzed to identify objects, and since objects may be oriented in different ways in the image data (for example, the front, the top, the side, angled), the image data may require further processing and analyzing to confirm the object, however the P and L of the object is still not provided. In contrast, using the enhanced computer vision system 102, transmitted signals are processed with minimal reliance on image data, and the computer vision system 102 not only hones in quickly on the object and identifies or recognizes it, but also provides a P and L of the object and accelerates the determination of the orientation of the object.

Proceeding with the computer maintenance example, a determination is made that the object (engine 300) comprises a component of interest (component 502) that must be inspected, repaired, or replaced. Responsive to determining that the component 502 requires some action, the enhanced computer vision system 102 identifies the component and commands the display system 120 to render the component in a visually distinguishable manner with respect to the remainder of the displayed image 500. In FIG. 5, component 502 is shown darkened; however, any technique for visually distinguishing the component 502 from remaining components of the object (engine 300) may be employed.

For the duration of time that computer vision system 102 determines that the object (engine 300) is in the field of view (FOV 454) of a user, the camera 118 may be activated and recording image data. Responsive to receiving object data from transmitted signals, computer vision system 102 identifies the object and determines whether the respective object is an object of interest. As mentioned, responsive to determining that an object of interest is in the FOV 454, the camera 118 may be activated, and for as long as the object of interest is in the FOV 454, the camera 118 may continue to be active, recording a video stream of image data in the FOV that may be analyzed, processed, and stored. Returning to the CAM engine example, the duration of time that the camera 118 is active may be a duration of time that a mechanic is repairing the component 502 on the engine 300. Recording the mechanic making the repair may be helpful for training or quality assurance purposes. For the duration of time that the camera 118 is active, an indicator 504 may be displayed to alert a viewer that the computer vision system 102 is recording a video stream.

When there is no object of interest in the FOV, the camera 118 may be deactivated, and the indicator 504 may change color or be removed from the displayed image 500. The camera 118 may also be deactivated when it is determined that the user "looks" at a forbidden object (such as export control), "looks" in a forbidden area, or "looks" at another user wearing a computer vision system 102. Upon determining that the user has subsequently "looked" away, the camera may be reactivated. In these situations, where the user "looks" is defined as equal to the volume of space of the FOV 454. In addition, the camera 118 may be activated or deactivated responsive to user 402 or system input.

Displayed image 500 may be displayed on the display system 120, on a structure 550. In various embodiments, structure 550 is a pair of augmented reality glasses. In other embodiments, the display system 120 utilizes a computer screen or other display device described above for displaying image 500. One or more symbols 506 that provide direction and/or orientation may also be rendered on the displayed image 500.

Figure 6:
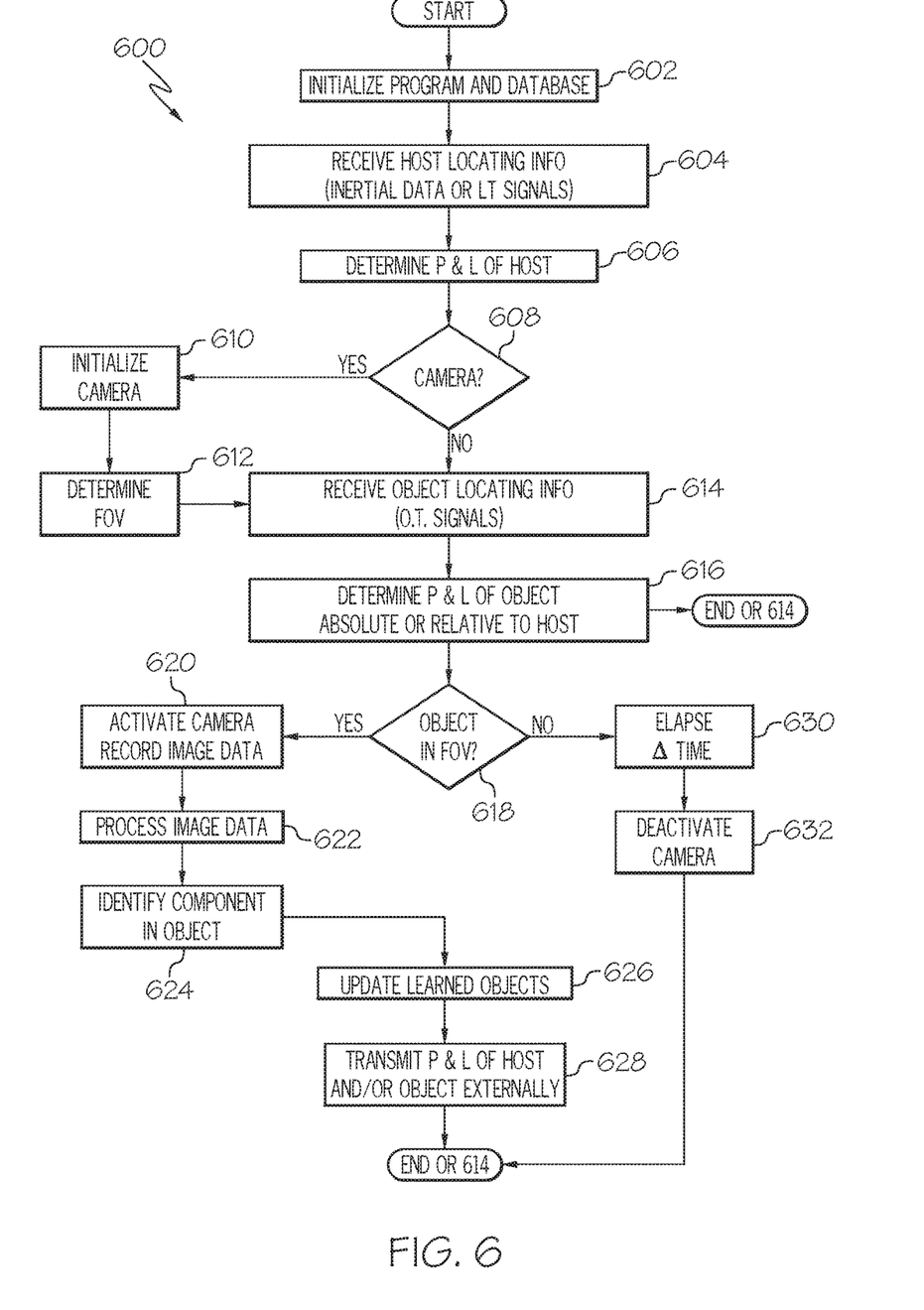
FIG. 6 provides a flow chart for a method for an enhanced computer vision system, in accordance with various embodiments.

Referring now to FIG. 6, and with reference to FIGS. 1-5, a flow chart is provided for a method 600 for a computer vision system 102, in accordance with various exemplary embodiments. Method 600 represents various embodiments of a method associated with the computer vision system 102. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

The method starts, and at 602 the computer vision module 140 is initialized. As mentioned above, initialization may comprise uploading or updating instructions and applications 160, the program 162, stored variables 164, and the various learned/fixed objects lookup tables stored in the learned/fixed database 156. At 602, the method 600 may poll itself to identify its components, such as to determine if there is an inertial system 116, if there is a camera 118, and what, if any, kind of display system 120 it may have command over. The program 162 may comprise rules and algorithms that, when executed by the processor 150, determine how the computer vision module 140 operates. A non-limiting example of a predetermined variable may include, for example, dimensions for determining a FOV 454, configurable timer variables for when to deactivate the camera 118, and the like.

At 604 host locating information is received. As alluded to earlier, the host comprises a point of reference at a position and location to which the location of other objects may be compared. In some embodiments, the host corresponds to a user 402 wearing the computer vision system 102. When the user 402 wears the computer vision systems 102, cooperative configuration of the inertial system 116 and the camera 118 assist the processor 150 in determining the position and location of the user 402, and to further determine the FOV 454 from the perspective of the user 402. In various embodiments, support structure 104 provides support surfaces sufficient to configure the inertial system 116, the camera 118, and the display system 120 for cooperative operation from the user's 402 perspective. In other embodiments, the host does not comprise an inertial system 116, instead corresponding to an object transmitter or location transmitter 132 participating in the CV environment 100. In which case, one or a plurality of transmitted signals (location transmitting signals 133 and/or object transmitting signals 135) received from transmitters 130 may provide host locating information.

At 606, a position and location (P and L) of the host is determined. This may be determined by processing inertia data received from the inertial system 116, or by processing location information included in location transmitting (LT) signals 133 and/or object transmitting (OT) signals 135. As mentioned, the transmitted signals (LT signals 133 and/or OT signals 135) may comprise location and membership information, and or match up with a learned/fixed object from the database 156; based thereon, the computer vision module 140 may process available data and deduce a host location.

At 608, if the computer vision system 102 comprises a camera 118, any remaining camera initialization may be performed at 610, and the FOV 454 may be determined at 612. In various embodiments, determining the FOV 454 may include retrieving dimensions stored in stored variables 164 and constructing the FOV 454 based thereon. In other embodiments, the program 162 may comprise rules that process additional inertial information and/or host information that modify the FOV 454. In embodiments of the computer vision system 102 that comprise a camera 118, it is understood that the camera 118 is configured such that its recording window or lens coincides with or includes the FOV 454.

At 614, the computer vision system 102 receives object locating information. In some embodiments, object locating information may be received in OT signals 135. In other embodiments, object locating information may be received via LT signals 133, such as, by comparing LT signal 133 information to learned/fixed object information in the database 156. At 616, the method 600 determines a position and location (P and L) of the object with respect to the host. At 616 the identification of the object is also determined (i.e., the object is recognized) based on the object locating information. The P and L of the object with respect to the host may be in absolute or relative terms. Once the P and L of the object is determined at 616, the process may end, or the method may selectively do one or more of: update the learned/fixed objects database 156 at 626, transmit object and P and L data externally at 628, or return to 614 for receiving additional object locating information.

At 618, when a FOV 454 has been created, the method 600 may determine whether or not the object is in the FOV 454 and the object is determined to be an object of interest. Determining that the object is an object of interest may be based on instructions included in program 162, or matching object identifications with preloaded lookup tables stored in memory 152. As mentioned, this determination is based on location information coming from one or more transmitted signals, and does not require an image processing activity. The position and location of the object can be compared to the dimensions, location and orientation of the FOV 454, and the determination about the object may be made. At 620, if the object is determined to be in the FOV 454 and the object is determined to be an object of interest, the camera 118 may be activated, which records a video stream of image data inclusive of the FOV 454 and therefore also inclusive of the object. It is to be understood that the camera 118 is oriented to include the FOV 454, and therefore, the captured image data comprises, at least substantially, the object.

At 622, the image data may be processed to identify a component of the object. At 626 the learned/fixed objects database 156 may be updated and at 628, the position and location of the host and/or the object may be transmitted externally. If a component of the object was identified by the process, for example, at 624, the component may be transmitted externally also. Method steps 622-628 are beneficial to CAM applications. For example, if a mechanic is tasked with fixing a valve on an engine, the computer vision system 102 may quickly hone in on the engine using transmitters and then highlight the valve. In various embodiments, responsive to 624, the computer vision system 102 may command the display system 120 to generate an action associated with the component on the display system using an AR system. Exemplary actions include any combination of: highlighting, animating, and displaying alphanumeric instructions associated with the component to assist in efficient and accurate engine maintenance.

When the method 600 determines, at 618, that the object is not in the FOV 454 any longer (or, that no object of interest is in the FOV 454), the camera 118 may be deactivated at 632. Deactivation may additionally comprise pausing of recording image data. Further, deactivation may occur after the elapse of a configurable amount of time at 630. After deactivating the camera at 632, the method may end or transmit data externally at 628.

As is readily appreciated, the above examples are non-limiting, and many others may be addressed the computer vision module 140. Thus, systems and methods for enhanced computer vision systems have been provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A method comprising:
   at an enhanced computer vision module,
   receiving host locating information comprising a position and a location of a host;
   processing the host locating information to determine a location and orientation of a field of view (FOV) of the host;
   configuring a camera associated with the host such that a video stream recoding window includes the FOV;
   receiving transmitted signals including object transmitting signals comprising, for each of one or more objects, a respective object identification and respective object locating information;
   continuously processing the object transmitting signals to determine when an object of the one or more objects is in the FOV, and whether the object is an object of interest; and
   when the object is an object of interest and the object is in the FOV,
   activating the camera to record a video stream inclusive of the object while the object is in the FOV; and
   after activating the camera, determining that a forbidden object is in the FOV, and deactivating the camera responsive to determining that the forbidden object is in the FOV.

2. The method of claim 1, wherein the host locating information comprises a position and location of the host.

3. The method of claim 2, wherein determining that the object is in the FOV comprises determining a position and location of the object with respect to the position and location of the host.

4. The method of claim 3, further comprising identifying a component in the object based on the video stream.

5. The method of claim 4, further comprising generating an action associated with the component responsive to identifying the component.

6. The method of claim 3, further comprising updating a database of learned objects responsive to identifying the object.

7. The method of claim 1, further comprising ceasing recording the video stream responsive to determining that the object is no longer in the FOV.

8. The method of claim 4, wherein the transmitted signals further comprise a location transmitting (LT) signal from a location transmitter.

9. The method of claim 8, wherein the location transmitter is one of a plurality of location transmitters arranged in known fixed locations, and wherein the LT signal comprises position and location information, and network membership information, for the location transmitter.

10. A system comprising:
    an inertial system coupled to a user for providing inertial data of the user;
    a camera coupled to the user and the inertial system; and
    an enhanced computer vision module comprising a processor, a memory device, and a database;
    the enhanced computer vision module configured to
    obtain the inertial data for the user;
    process the inertial data to determine an orientation and construct a field of view (FOV) from the perspective of the user;
    configure the camera such that a video stream recoding window includes the FOV; receive transmitted signals comprising object transmitting signals including, for each of one or more objects, a respective object identification and respective object locating information;

continuously process the object transmitting signals to determine when an object of the one or more objects is in the FOV, and whether the object is an object of interest; and when the object is an object of interest and the object is in the FOV,
- activate the camera to record a video stream inclusive of the object;
- process the video stream to identify a component of the object; and
- cease recording of the video stream when the FOV no longer includes the object; and when the camera is activated,
- determine that a forbidden object is in the FOV, and deactivate the camera responsive to determining that the forbidden object is in the FOV.

11. The system of claim 10, wherein the enhanced computer vision module is further configured to determine a position and location of the host.

12. The system of claim 11, wherein the enhanced computer vision module is further configured to determine a position and location of the object with respect to the position and location of the host.

13. The system of claim 12, wherein the enhanced computer vision module is further configured to identify a component in the object based on the video stream.

14. The system of claim 13, wherein the enhanced computer vision module is further configured to: generate an action associated with the component responsive to identifying the component; and command a display system responsive to the generated action.

15. The system of claim 14, wherein the enhanced computer vision module is further configured to update a database of learned objects responsive to identifying the object.

16. A method comprising:
- obtaining inertial data from an inertial system that is associated with a user;
- determining a field of view (FOV) associated with the user based on the inertial data;
- initializing a camera coupled to the inertial system and configured to record a video stream comprising the FOV;
- continuously processing received transmitting signals comprising object locating information to determine whether the FOV includes an object of interest; and
- when the FOV includes the object of interest,
  - activating the camera to record a video stream inclusive of the object of interest;
  - processing the video stream to identify a component of the object of interest; and
- when the FOV does not include the object of interest, deactivating the camera.

17. The method of claim 16, further comprising generating, on a display system, an action associated with the component.

18. The method of claim 17, wherein the transmitting signals comprise an object transmitting (OT) signal from an object transmitter affixed to the object of interest.

19. The method of claim 18, wherein the transmitting signals further comprise a location transmitting (LT) signal from a location transmitter in a fixed location.

* * * * *